United States Patent [19]
Taniguchi et al.

[11] 3,892,114
[45] July 1, 1975

[54] CONTAINERS FOR USE IN EXTRUSION PRESS AND METHOD OF MANUFACTURING THE SAME

[75] Inventors: Hiroyoshi Taniguchi; Toshio Wakabayashi; Takuma Maeda; Kenzi Ishimoto, all of Ube, Japan

[73] Assignee: Ube Industries, Ltd., Ube, Japan

[22] Filed: July 10, 1974

[21] Appl. No.: 487,049

[52] U.S. Cl. .................. 72/272; 29/447; 220/63 R
[51] Int. Cl. ........................................ B21c 27/00
[58] Field of Search ......... 29/447; 72/272; 138/140, 138/147, 148; 220/63 RX

[56] References Cited
UNITED STATES PATENTS

| 1,693,838 | 12/1928 | Faudi | 29/447 |
| 2,283,791 | 5/1942 | Clark | 72/272 |
| 2,386,747 | 10/1945 | Ris | 29/447 UX |
| 2,544,302 | 3/1951 | Duncan | 29/447 X |
| 3,478,562 | 11/1969 | Groos | 72/272 |
| 3,530,702 | 9/1970 | De Ridder | 72/272 X |
| 3,602,620 | 8/1971 | Fassler | 29/447 X |

Primary Examiner—Charlie T. Moon
Attorney, Agent, or Firm—Charles E. Pfund, Esq.

[57] ABSTRACT

In a container for use in an extrusion press of the type comprising an inner cylinder having a noncircular opening and an outer cylinder applied about the inner cylinder by shrinkage fit, a plurality of circumferential recesses are provided for the inner or outer cylinder at the interface between them at portions corresponding to the portions of the noncircular opening having small pressure receiving areas. The recess has a predetermined radial depth and extends along the entire axial length of the inner and outer cylinders.

14 Claims, 8 Drawing Figures

CONTAINERS FOR USE IN EXTRUSION PRESS AND METHOD OF MANUFACTURING THE SAME

BACKGROUND OF THE INVENTION

This invention relates to an extrusion press for extruding metals and more particularly to a container having a noncircular axial opening and utilized for such machine.

Although an extrusion press requires a large extrusion pressure it is advantageous to continuously articles having any desired cross-sectional configuration.

FIG. 1 of the accompanying drawing illustrates a typical construction of a conventional metal extrusion press comprising a cylindrical platen 1 containing a main piston 2 for applying extruding pressure, and an end platen 3 spaced a definite distance from the cylindrical platen 1. The cylindrical platen 1 and the end platen 3 are connected together by means of a plurality of tie bars 4. The end platen 3 is provided with a pair of container cylinders 5 slidably receiving pistons 5a, and a container 8 provided with a heating device 7 is mounted on the outer ends of the piston rods 6 of the pistons 5a. A metal die 9 is secured to the center of the end platen 3 on the side thereof facing to the container 8 in the condition of being embraced by a die slide 9a guided by a guide 9b. An opening is formed through the center of the container 8 to receive a billet 10 to be worked which is made of aluminum, for example, and the stem 11 of the main piston 2. A dummy block 12 is mounted on one end of the stem 11 which is received in the central opening of the container 8. In operation, operating fluid is admitted into the cylindrical platen 1 to apply pressure to the billet 10 by the main piston 2 thus extruding the billet through the die 9 to obtain a product having a desired cross-sectional configuration.

The detail of the container 8 will be described with reference to a sectional view shown in FIG. 2. As shown in this figure, the container 8 comprises an outer cylinder 13 and an inner cylinder 14 fastened to outer cylinder 13 by shrinkage fit. A heater 7 surrounded by heat insulating material 15 is embedded in the outer cylinder 13. With this construction, since the shape of the opening 14a of the inner cylinder 14 is a true circle it is possible to extrude products having circular or cylindrical cross-sectional configuration. But, if such extruder is used to extrude an article having a rectangular cross-sectional configuration as shown by dotted lines in FIG. 2, it would be necessary to use a billet having a larger sectional area than that of the product 16 which requires higher extrusion pressure and hence is uneconomical.

To obviate the difficulty described above, a container having a noncircular opening as shown in FIG. 3 has been proposed. As shown in FIG. 3, the inner opening 17 of the inner cylinder 14 has an elliptical cross-sectional configuration closely resembling that of the product 16. The term "noncircular" used herein includes, elliptical, rectangular and similar shapes that contain elements designated by major axes, minor axes, longer sides, shorter sides, etc.

FIG. 4 shows an end view of the inner cylinder 14. Let us consider the forces applied to the inner wall of the opening at the time of extrusion in terms of rectangular coordinates having an origin at the center 0 of the opening 17. During extrusion, pressure p is uniformly applied per unit area of the inner wall of the opening 17. Denoting the pressure receiving areas of the upper and lower walls and left and righthand walls of the opening respectively by $A_1 = A_2$ and $B_1 = B_2$, the pressure applied to the upper and lower walls is expressed by $PA_1 = PA_2$ and that applied to the left and righthand walls is expressed by $PB_1 = PB_2$. Since $A_1 = A_2 > B_1 = B_2$ and $PA_1 = PA_2 > PB_1 = PB_2$, the opening 17 tends to expand in the direction of the minor axes as shown by dot and dash lines in FIG. 4 with the result that a large tension T is applied to points $T_1$ and $T_2$ along the major axes. Where the pressure is excessive, the cylinder would be broken at these points. Such danger can be prevented only by using a material having a large tensile strength for the inner cylinder 14 or by increasing the wall thickness of the outer cylinder 13. Both of these approaches increase cost and weight of the container.

SUMMARY OF THE INVENTION

Accordingly, it is an object of this invention to provide an improved container having a noncircular opening and used in an extrusion press which does not apply large tensile force that tends to decrease the mechanical strength of the inner cylinder upon the portions thereof having small pressure receiving areas.

Another object of this invention is to provide an improved container of compact and rugged construction according to which it is possible to reduce the wall thickness of the outer cylinder and it is not necessary to form the inner cylinder of a special high tension steel.

According to one aspect of this invention there is provided a container for use in an extrusion press of the type comprising an inner cylinder having an opening of a noncircular cross-sectional configuration and an outer cylinder applied about the inner cylinder by shrinkage fit, characterized in that a plurality of circumferential recesses are provided for the inner cylinder or the outer cylinder at the interface therebetween at portions corresponding to the portions of the noncircular opening having small pressure receiving areas, and that each recess has a predetermined circumferential width and a predetermined radial depth and extends along the entire axial length of of the inner and outer cylinders.

According to another aspect of this invention, there is provided a method of manufacturing a container for use in an extrusion press of the class including an inner cylinder having a noncircular axial opening and an outer cylinder surrounding the inner cylinder, characterized by the steps of forming a plurality of axial recesses on the outer surface of the inner cylinder or on the inner surface of the outer cylinder at portions corresponding to the portions of the noncircular opening having small pressure receiving areas, each recess having a predetermined circumferential width and a predetermined radial depth, and applying the outer cylinder about the inner cylinder by shrinkage fit, thus causing the inner surface of the outer cylinder or the outer surface of the inner cylinder to partially protrude into the recess.

According to still another aspect of this invention an electric heater is embedded in the outer cylinder for heating a billet contained in the noncircular opening and to be extruded by the machine. The heater is provided only at portions of the piter cylinder not surrounding the recesses or the density of the heater is decreased at portions corresponding to the recesses.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENTS

Figure 5:
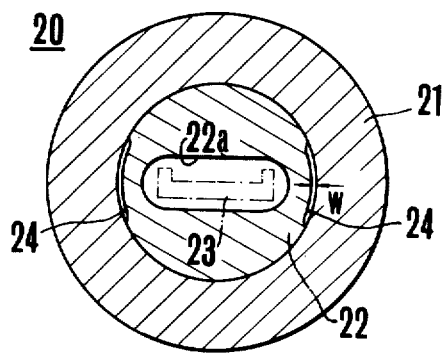
FIG. 5 shows a cross-sectional view of the improved container embodying the invention.

With referring now to FIG. 5 which illustrates a preferred embodiment of this invention, a container 10 comprises an outer cylinder 21 and an inner cylinder 22 secured thereto by shrinkage fit. At the center of the inner cylinder 22 is formed an elliptical opening 22a covering a product 23 having a rectangular cross-sectional configuration, the ratio of the major axis to the minor axis of the ellipse being close to the ratio of the longer side to the shorter side of the product. Diametrically opposite recesses, each having a predetermined radial depth W and extending in the axial direction, are formed on the outer periphery of the cylinder 22 at portions corresponding to the portions of the opening 22a having small pressure receiving areas.

Figure 6:
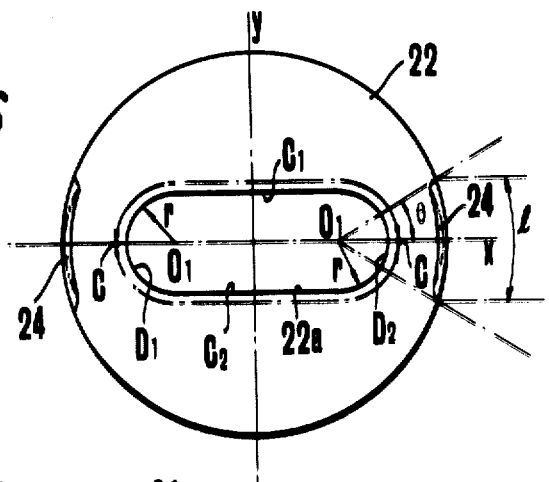
FIG. 6 is a diagram to explain the force relationship in the container shown in FIG. 5.

The result of our experiments shows that best results are obtained when the peripheral width $l$ of each recess 24 is made to be slightly larger than twice times of the radius $r$ of the portions of the opening 22a having small pressure receiving areas, as shown by an enlarged view shown in FIG. 6, or when the angle $\theta$ between the abscissa $x$ of the rectangular coordinate and a line interconnecting the center $O_1$ of the arcuate end portions of the opening 22a having a radius $r$ and small pressure receiving areas and the peripheral end of the recess is made to be approximately equal to 30°. The result of the experiment also shows that the radial depth W of the recess should be about 1.5–3/1000 times of the diameter D of the inner cylinder 22. It is also desirable to design such that, after the shrinkage fit, the outer cylinder will shrink and partially project into the recesses to decrease substantially to zero the depth W.

Figure 7:
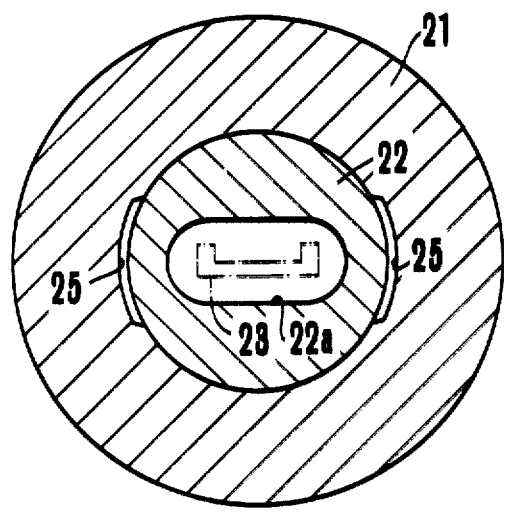
FIG. 7 shows a cross-sectional view of a modified embodiment of this invention and FIG. 8 is a diagram to show the arrangement of the heater utilized in the container of this invention.

By designing the outer cylinder 22 in a manner described above, the pressure exerted by the outer cylinder, which is applied by shrinkage fit, is applied uniformly to portions of the inner cylinder 22 other than the recesses 24 but such pressure is not applied to the portions of the inner cylinder corresponding to the recesses 24. Consequently, when an internal pressure is applied to the interior of the opening 22a during extrusion, portions $D_1$ and $D_2$ having smaller pressure receiving areas undergo larger deformation than portions $C_1$ and $C_2$ having larger pressure receiving areas (see FIG. 6). As a result, the opening 22a undergoes larger deformation in the direction of major axes as shown by dot and dash lines, and the portions of the inner cylinder 22 between the recesses 24 are deformed toward the outer cylinder 21, thus applying a bending moment to the portions of the inner cylinder in the direction of axis $x$ whereas compression forces upon the inner end portions C of the inner cylinder 21. These compression forces are assisted by the compression force applied in the direction of y axis due to the shrinkage fit. Such advantageous effect can also be obtained by providing recesses 25 for the inner wall of the opening of the outer cylinder 21 as shown in FIG. 7. It should be noted that the same effect can be exprected even if such soft metal as aluminum or copper should be inserted in recesses 24 or 25.

Figure 1:
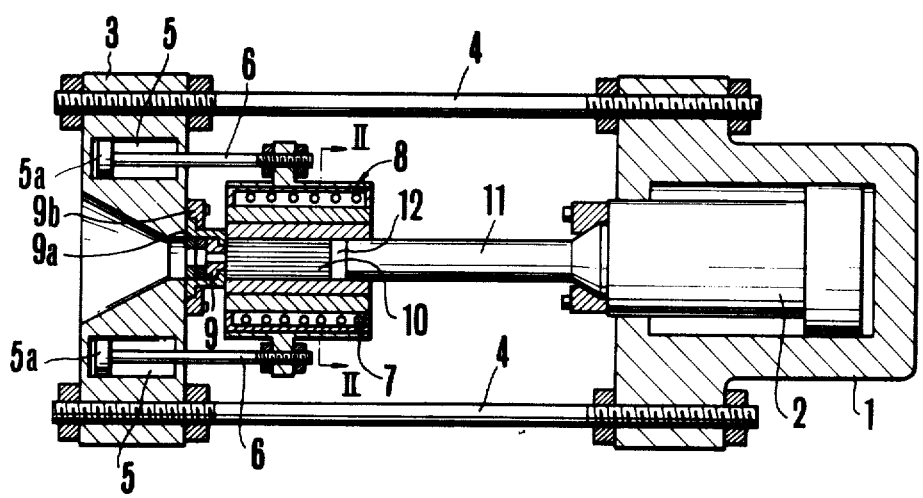
FIG. 1 shows a longitudinal sectional view of a typical extrusion press.
Figure 2:
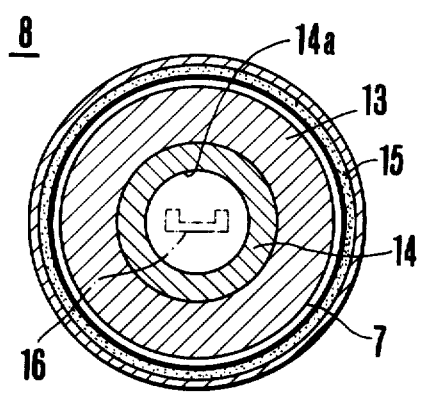
FIG. 2 is a cross-sectional view of the container shown in FIG. 1 taken along a line II — II.
Figure 3:
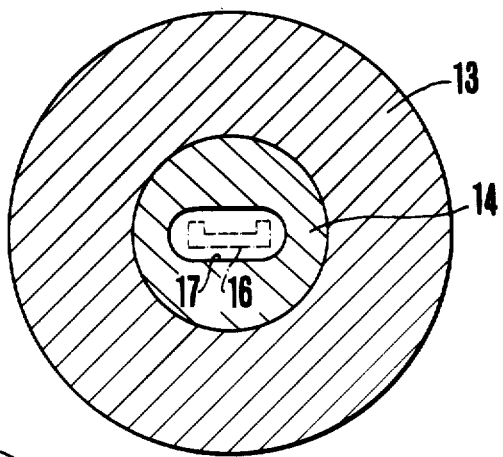
FIG. 3 shows a cross-sectional view of a prior art container.
Figure 4:
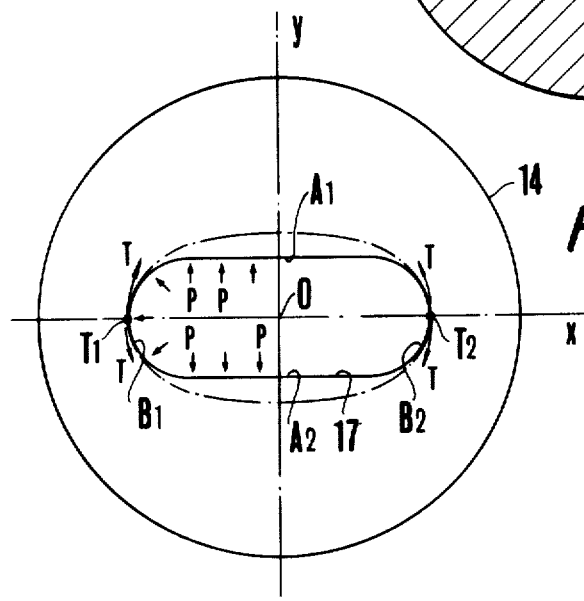
FIG. 4 is a diagram to show the relationships between forces applied to the walls of the central opening of the container shown in FIG. 3.
Figure 8:
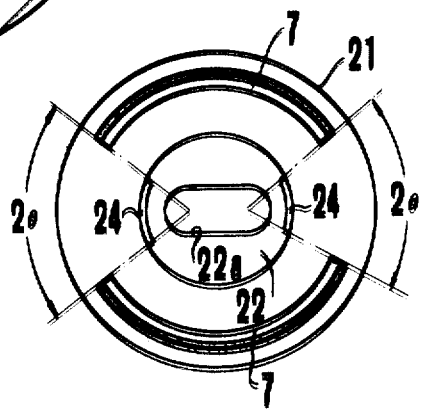

The extrusion press is generally used to extrude the articles by heating the container 20 by the heater. Accordingly, a thermal stress is created in the container 20. More particularly, as shown in FIG. 2, as the container is heated by heater 7 from the side of the outer cylinder 21, the temperature of the inner cylinder is lower than that of the outer cylinder 21 with the result that both the inner and outer cylinder 22 and 21 tend to expand outwardly. This increases the diameter of the opening 22a of the inner cylinder 22 thus applying a large tension to the inner wall, especially the point C, of the opening 22a. Since the tension created in this manner also affects the mechanical strength of the inner cylinder 22 it is necessary to decrease such tension. According to this invention, as shown in FIG. 8, the heater 7 is not provided for the portions corresponding to the recesses 24 or 25 provided for the inner cylinder 22 or outer cylinder 21, or the density of the heater is decreased at these portions. Thus, the thermal stress created in the portions of the inner cylinder 22 corresponding to the recesses 24 or 25 is decreased thereby decreasing the tension acting upon the portions of the opening 22a of the inner cylinder 22 having small pressure receiving areas.

Although dependent upon the material of the billet, the billet is usually heated to a temperature of from 400°C to 450°C it is advantageous to control the temperature of the portions on the outer surface of the inner cylinder 22 corresponding to the recesses 24 or 25 to be less than 500°C which is determined by the configuration of the opening 22a by not providing heater 7 or by decreasing the density thereof in a range of $2\theta \approx 60°$ which is the angle subtended by a recess, thus making the temperature of the outer periphery of the outer cylinder to be about 550°C to 600°C.

With the container 20 constructed as described above, when a large internal pressure is created in the opening 22a of the inner cylinder 22 during the operation of the extruder, the inner cylinder 22 is expanded in the direction of the $x$ axis to decrease the depth of the recesses 24 or 25 thus applying a compressive force upon the portions of the opening 22a having a small pressure receiving area. Since such compressive force manifests a large resistance against the internal pressure it is possible to prevent breakage of the inner cylinder at its portions having small pressure receiving areas. Moreover, as the compressive force manifests a large resistance against the internal pressure it is not necessary to use a material having a high tensile strength to construct the inner cylinder. Further, the wall thickness of the outer cylinder is not required to be large so that it is possible to obtain a compact container having a large mechanical strength. Miniaturization of the container also reduces the size, weight, cost of manufacturing and installation space of the extrusion press as a whole. Further, according to this invention, since the temperature of the outer cylinder is controlled by not providing the heater or by decreasing the density of heater at portions corresponding to the recesses 24 or 25 it is possible to decrease the effect of the tension at the side walls of the opening of the inner cylinder created by the thermal stress thus increasing the resistance against the internal pressure in the inner cylinder.

Although the invention has been described in terms of its preferred embodiments it will be clear that many changes and modifications will be obvious to one skilled in the art without departing from the true spirit and scope of the invention as defined in the appended claims.

What is claimed is:

1. In a container for use in an extrusion press of the type comprising an inner cylinder having an opening of a noncircular cross-sectional configuration and an outer cylinder applied about said inner cylinder by shrinkage fit, the improvement wherein the interface between said inner and outer cylinders is provided with a plurality of circumferentially recesses at portions corresponding to the portions of said noncircular opening having small pressure receiving areas, each recess having a predetermined peripheral width and a predetermined radial depth and extending along the entire axial length of said inner and outer cylinders.

2. The container according to claim 1 wherein said recesses are provided on the outer surface of said inner cylinder.

3. The container according to claim 1 wherein said recesses are provided on thee inner surface of said outer cylinder.

4. The container according to claim 1 wherein said opening takes the form of an elongated rectangle with its shorter sides rounded, said opening has an area larger than the cross-sectional area of the article to be manufactured by said extrusion press, and said recesses are provided at portions surrounding said rounded sides.

5. The container according to claim 4 wherein said shorter rounded sides has a radius of $r$, and said recesses has a circumferential width of $2r$.

6. The container according to claim 4, wherein the longer sides of said elongated rectangle extend in the direction of the $x$ axis and the shorter sides in the direction of the $y$ axis of a rectangular coordinate, each recess subtends an angle of about 60° with respect to the center of the rounded shorter side, and said recesses are symmetrical with respect to the $x$ axis.

7. The container according to claim 1 wherein each recess has a depth $W = 1.5 - 3/1000$ D before shrinkage fitting where D represents outer diameter of said inner cylinder.

8. The container according to claim 1 which further comprises a heater embedded in said outer cylinder.

9. The container according to claim 8 wherein said heater is provided only at portions of said outer cylinder not surrounding such recesses.

10. The container according to claim 8 wherein the density of said heater is decreased at portions corresponding to said recesses.

11. A method of manufacturing a container for use in an extrusion press of the class including an inner cylinder having a noncircular axial opening and an outer cylinder surrounding said inner cylinder, said method comprising the steps of forming a plurality of axial recesses on the outer surface of said inner cylinder at portions corresponding to the portions of said non-circular opening having small pressure receiving areas, each recess having a predetermined circumferential width and a predetermined radial depth, and applying said outer cylinder about said inner cylinder by shrinkage fit, thus causing inner surface of said outer cylinder to partially protrude into said recesses.

12. A method of manufacturing a container for use in an extrusion press of the class including an inner cylinder having a noncircular axial opening and an outer cylinder surrounding said inner cylinder, said method comprising the steps of forming a plurality of axial recesses on the inner surface of said outer cylinder at portions corresponding to the portions of said noncircular opening having small pressure receiving areas, each recess having a predetermined circumferential width and a predetermined radial depth, and applying said outer cylinder about said inner cylinder by shrinkage fit, thus causing the outer surface of said inner cylinder to partially protrude into said recesses.

13. The method according to claim 11 wherein said opening takes the form of an elongated rectangle with its shorter sides rounded, said opening has an area larger than the cross-sectional area of the article to be manufactured by said extrusion press and said recesses are provided at portions surrounding said rounded sides.

14. The method according to claim 12 wherein said opening takes the form of an elongated rectangle with its shorter sides rounded, said opening has an area larger than the cross-sectional area of the article to be manufactured by said extrusion press and said recesses are provided at portions surrounding said rounded sides.

* * * * *